United States Patent
Liu

(10) Patent No.: US 11,272,051 B2
(45) Date of Patent: Mar. 8, 2022

(54) METHOD FOR NOTIFICATION REMINDER, TERMINAL, AND STORAGE MEDIUM

(71) Applicant: GUANGDONG OPPO MOBILE TELECOMMUNICATIONS CORP., LTD., Guangdong (CN)

(72) Inventor: Qihu Liu, Guangdong (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 0 days.

(21) Appl. No.: 16/885,859

(22) Filed: May 28, 2020

(65) Prior Publication Data

US 2020/0296207 A1    Sep. 17, 2020

Related U.S. Application Data

(63) Continuation of application No. PCT/CN2018/123577, filed on Dec. 25, 2018.

(30) Foreign Application Priority Data

Dec. 25, 2017 (CN) .......................... 201711418894.6
Dec. 25, 2017 (CN) .......................... 201711419886.3
Dec. 25, 2017 (CN) .......................... 201711421116.2

(51) Int. Cl.
*H04M 1/72484* (2021.01)
*H04M 19/04* (2006.01)
(Continued)

(52) U.S. Cl.
CPC ... *H04M 1/72484* (2021.01); *H04M 1/72403* (2021.01); *H04M 1/72451* (2021.01); *H04M 1/72454* (2021.01); *H04M 19/04* (2013.01)

(58) Field of Classification Search
CPC . H04W 4/16; H04W 68/005; H04M 1/72403; H04M 1/72451; H04M 1/72454;
(Continued)

(56) References Cited

U.S. PATENT DOCUMENTS

2004/0268265 A1    12/2004  Berger
2006/0240877 A1    10/2006  Filiba et al.
(Continued)

FOREIGN PATENT DOCUMENTS

CN    1859491 A    11/2006
CN    101202780 A    6/2008
(Continued)

OTHER PUBLICATIONS

Extended European search report issued in corresponding European application No. 18894393.0 dated Oct. 26, 2020.
(Continued)

*Primary Examiner* — Erica Navar
(74) *Attorney, Agent, or Firm* — Young Basile Hanlon & MacFarlane, P.C.

(57) ABSTRACT

A method for notification reminder, a terminal, and a storage medium are provided, relating to the technical field of notification reminder. The method includes the following. A notification is received in a do not disturb (DND) mode, where the notification is at least one of: an incoming call notification, a short message notification, or an application notification. A contact corresponding to the notification is identified. Notification reminder is performed in a predetermined manner when the contact belongs to a preset contact group. Notification reminder is skipped when the contact does not belong to the preset contact group. The preset contact group is a group that allows notification reminder in the DND mode by default.

16 Claims, 12 Drawing Sheets

(51) Int. Cl.
*H04M 1/72403* (2021.01)
*H04M 1/72451* (2021.01)
*H04M 1/72454* (2021.01)

(58) Field of Classification Search
CPC .. H04M 1/72484; H04M 1/725; H04M 19/04; H04M 19/045
See application file for complete search history.

(56) References Cited

U.S. PATENT DOCUMENTS

| | | | |
|---|---|---|---|
| 2013/0311579 | A1 | 11/2013 | Cohen |
| 2014/0057619 | A1* | 2/2014 | Chen ............... H04W 24/02 455/418 |
| 2014/0177812 | A1* | 6/2014 | Barrett ............ H04M 3/5116 379/47 |
| 2014/0308936 | A1 | 10/2014 | Elliott et al. |
| 2017/0171377 | A1 | 6/2017 | Albouyeh et al. |

FOREIGN PATENT DOCUMENTS

| | | |
|---|---|---|
| CN | 101552835 A | 10/2009 |
| CN | 101951426 A | 1/2011 |
| CN | 102082882 A | 6/2011 |
| CN | 102420906 A | 4/2012 |
| CN | 102957781 A | 3/2013 |
| CN | 103067568 A | 4/2013 |
| CN | 103167451 A | 6/2013 |
| CN | 103458120 A | 12/2013 |
| CN | 104683591 A | 6/2015 |
| CN | 105100350 A | 11/2015 |
| CN | 106303079 A | 1/2017 |
| CN | 106713674 A | 5/2017 |
| CN | 106911556 A | 6/2017 |
| CN | 106998394 A | 8/2017 |
| CN | 107197096 A | 9/2017 |
| CN | 107222629 A | 9/2017 |
| CN | 107241481 A | 10/2017 |
| CN | 108055397 A | 5/2018 |
| JP | 2004072713 A | 3/2004 |
| JP | 2004312105 A | 11/2004 |
| JP | 2014175682 A | 9/2014 |
| JP | 2015015665 A | 1/2015 |
| JP | 2017059862 A | 3/2017 |

OTHER PUBLICATIONS

Examination report No. 1 issued in corresponding AU application No. 2018393399 dated Dec. 14, 2020.
International search report issued in corresponding application No. PCT/CN2018/123577 dated Mar. 6, 2019.
English Translation for Notification to Grant Patent Right for Invention issued in corresponding CN application No. 201711421116.2 dated Sep. 4, 2019.
English Translation for Notification to Grant Patent Right for Invention issued in corresponding CN application No. 201711418894.6 dated Jul. 6, 2020.
English Translation for The first office action issued in corresponding CN application No. 201711421116.2 dated May 7, 2019.
English Translation for The first office action issued in corresponding CN application No. 201711419886.3 dated Apr. 26, 2019.
English Translation for Notification to Grant Patent Right for Invention issued in corresponding CN application No. 201711419886.3 dated Jul. 15, 2020.
English Translation for The first office action issued in corresponding CN application No. 201711418894.6 dated May 7, 2019.
English Translation for The second office action issued in corresponding CN application No. 201711418894.6 dated Sep. 3, 2019.
English Translation for The third office action issued in corresponding CN application No. 201711418894.6 dated Dec. 4, 2019.
Japanese Office Action with English Translation for JP Application 2020533712 dated Jul. 9, 2021. (13 pages).
Korean Office Action with English Translation for KR Application 1020207018008 dated Jul. 12, 2021. (9 pages).
Indian Examination Report for IN Application 202017029329 dated Nov. 10, 2021. (6 pages).

* cited by examiner ing implementations. Apparently, the accompanying drawings in the following description illustrate some implementations of the present disclosure. Those of ordinary skill in the art may also obtain other drawings based on these accompanying drawings without creative efforts.

METHOD FOR NOTIFICATION REMINDER, TERMINAL, AND STORAGE MEDIUM

CROSS-REFERENCE TO RELATED APPLICATION(S)

This application is a continuation of International Application No. PCT/CN2018/123577, filed on Dec. 25, 2018, which claims priority to Chinese Patent Application No. 201711421116.2, filed on Dec. 25, 2017, Chinese Patent Application No. 201711418894.6, filed on Dec. 25, 2017, and Chinese Patent Application No. 201711419886.3, filed on Dec. 25, 2017, the entire disclosures of all of which are hereby incorporated by reference.

TECHNICAL FIELD

This disclosure relates to the technical field of notification reminder, and particularly to a method for notification reminder, a terminal, and a storage medium.

BACKGROUND

In order to avoid unexpected incoming calls or short messages from causing disturbance to current important business, users usually set a terminal to enter a do not disturb (DND) mode when dealing with important business.

In the related art, the terminal provides an entrance for DND setting in the system settings, and the user can quickly set the terminal to enter the DND mode through the entrance. When a call or a short message is received in the DND mode, the terminal will not perform notification reminder through sound or vibration.

SUMMARY

According to a first aspect, a method for notification reminder is provided. The method includes the following.

A notification is received in a do not disturb (DND) mode, where the notification is at least one of: an incoming call notification, a short message notification, or an application notification. A contact corresponding to the notification is identified. Notification reminder is performed in a predetermined manner when the contact belongs to a preset contact group. Notification reminder is skipped or not made when the contact does not belong to the preset contact group. The preset contact group is a group that allows notification reminder in the DND mode by default.

According to a second aspect, a terminal is provided. The terminal includes at least one processor and a non-transitory computer readable storage. The computer readable storage is coupled to the at least one processor and stores at least one computer executable instruction thereon which, when executed by the at least one processor, causes the at least one processor to execute the method of the first aspect.

According to a third aspect, a non-transitory computer readable storage medium is provided. The non-transitory computer readable storage medium is configured to store a computer program which, when executed by a processor, causes the processor to execute the method of the first aspect.

BRIEF DESCRIPTION OF THE DRAWINGS

To describe technical solutions in implementations of the present disclosure more clearly, the following briefly introduces accompanying drawings required for illustrating the FIG. 1 and FIG. 2 are structural block diagrams each illustrating a terminal according to implementations.

DETAILED DESCRIPTION

To make objectives, technical solutions, and advantages of the present application clearer, implementations of the application will be described in further detail below with reference to the accompanying drawings.

Figure 1:
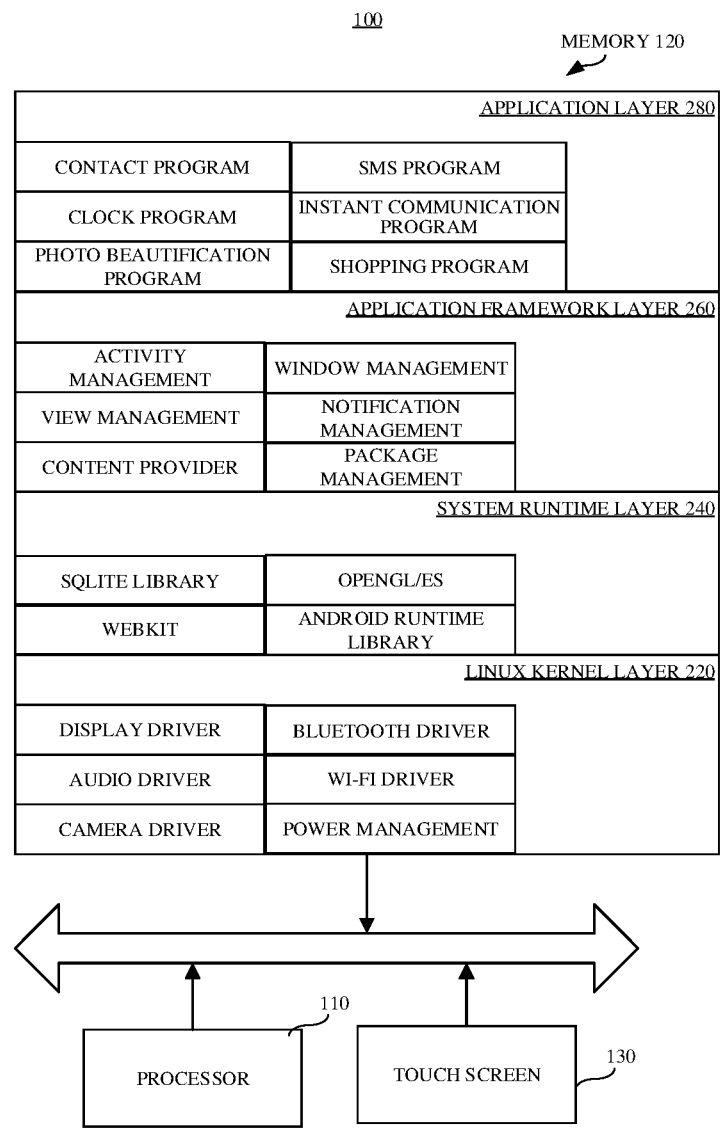
Figure 2:
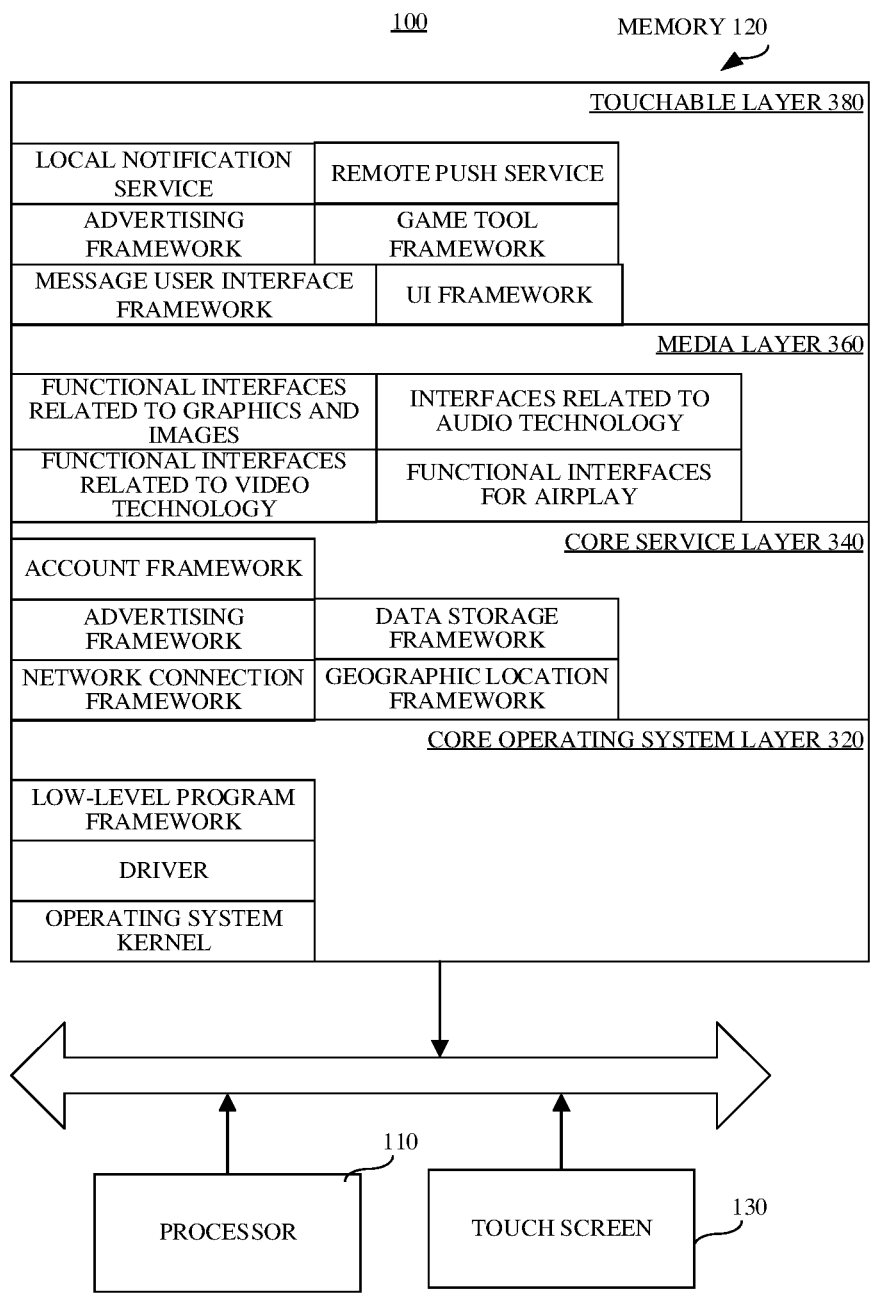

FIG. 1 and FIG. 2 each illustrate a structural block diagram of a terminal 100 according to implementations. The terminal 100 can be a smart phone, a tablet computer, a notebook computer, or the like. The terminal 100 in the present disclosure can include one or more of the following components: at least one processor 110 (such as a processor 110), a non-transitory computer readable storage 120 (such as a memory 120), and a touch screen 130. The memory 120 is configured to store at least one instruction, which when loaded and executed by the processor 110, are configured to implement the method for notification reminder and the method for group adding of the implementations below.

The processor 110 can include one or more processing cores. The processor 110 connects various parts of the entire terminal 100 by using various interfaces and lines, and executes or performs the instructions, programs, code sets, or instruction sets stored in the memory 120, and deploys the data stored in the memory 120, to execute various functions and processing data of terminal 100. In an example, the processor 110 can use at least one hardware form of digital signal processing (DSP), field-programmable gate array (FPGA), and programmable logic array (PLA) to implement. The processor 110 may integrate one or a combination of a central processing unit (CPU), a graphics processing unit (GPU), and a modem. The CPU is mainly configured to handle the operating system, user interface, and application programs; the GPU is responsible for rendering and drawing the content to be displayed by the touch screen 130; and the modem is used for processing wireless communication. It can be understood that the modem may not be integrated into the processor 110 and may be implemented by a single chip.

The memory 120 may include random access memory (RAM) and may also include read-only memory (ROM). In an example, the memory 120 includes a non-transitory computer-readable storage medium. The memory 120 may be used to store instructions, programs, codes, code sets, or instruction sets. The memory 120 may include a storage program area and a storage data area, where the storage program area may store instructions for implementing an operating system, instructions for at least one function (such as a touch function, a sound playback function, an image playback function, etc.), and instructions for implementing the following method implementations; the storage data area may store data (such as audio data, phone book) created according to the use of terminal 100.

Taking the operating system of an Android system as an example, the programs and data stored in the memory 120 are illustrated in FIG. 1. The memory 120 stores a Linux kernel layer 220, a system runtime layer 240, an application framework layer 260, and an application layer 280. The Linus kernel layer 220 provides low-level drivers for various hardware of the terminal 100, such as display drivers, audio drivers, camera drivers, Bluetooth drivers, wireless fidelity (Wi-Fi) drivers, power management, and so on. The system runtime layer 240 provides major feature support for the Android system through some C/C++ libraries. For example, the SQLite library provides support for database, the OpenGL/ES library provides support for 3D drawing, and the Webkit library provides support for browser kernel. The Android runtime library 242 is also provided in the system runtime layer 240, which mainly provides some core libraries for allowing developers to write Android applications using the Java language. The application framework layer 260 provides various APIs that may be used when building application programs. Developers can also use these APIs to build their own applications, such as activity management, window management, view management, notification management, content providers, package management, call management, resource management, and location management. There is at least one application running in the application layer 280. These applications can be contact programs, short message (SMS) programs, clock programs, camera applications, etc. that are native to the operating system; they can also be applications developed by third-party developers, such as instant communication programs, photo beautification programs, etc.

Taking the operating system of an IOS system as an example, the programs and data stored in the memory 120 are illustrated in FIG. 2. The IOS system includes: a core operating system layer 320, a core service layer 340, a media layer 360, and a touchable layer (also called Cocoa touch layer) 380. The core operating system layer 320 includes an operating system kernel, drivers, and low-level program frameworks. These low-level program frameworks provide functions closer to the hardware for use by the program framework located at the core service layer 340. The core service layer 340 provides system services and/or program frameworks required by the application program, such as a foundation framework, an account framework, an advertising framework, a data storage framework, a network connection framework, a geographic location framework, a motion framework, and so on. The media layer 360 provides audio-visual-related interfaces for applications, such as interfaces related to graphics and images, interfaces related to audio technology, interfaces related to video technology, and AirPlay interfaces for audio and video transmission technologies. The touchable layer 380 provides various commonly-used interface-related frameworks for application development. The touchable layer 380 is responsible for user touch interactive operations on the terminal 100. For example, a local notification service, a remote push service, an advertising framework, a game tool framework, a message user interface (UI) framework, a user interface UIKit framework, a map framework, and so on.

Among the frameworks illustrated in FIG. 2, frameworks related to most applications include, but are not limited to: a basic framework in the core service layer 340 and a UIKit framework in the touchable layer 380. The basic framework provides many basic object classes and data types and provides the most basic system services for all applications, regardless of the UI. The classes provided by the UIKit framework are basic UI class libraries for creating touch-based user interfaces. IOS applications can provide UI based on the UIKit framework, so it provides the application's infrastructure for building user interfaces, drawing, handling and user interaction events, responding to gestures, and more.

The touch screen 130 is used for displaying a user interface for various applications, and receiving a touch operation by a user using a finger, a touch pen, or any suitable object on or nearby. The touch screen 130 is usually disposed on the front panel of the terminal 100. The touch screen 130 may be designed as a full screen, a curved screen, or a special-shaped screen. The touch screen 130 can also be designed as a combination of a full screen and a curved screen, and a combination of a special-shaped screen and a curved screen, which is not limited in this example.

In addition, those skilled in the art can understand that the structure of the terminal 100 illustrated in the above figures does not constitute a limitation on the terminal 100. The terminal may include more or fewer components than illustrated in the drawings, or combine certain components, or different component arrangements. For example, the terminal 100 further includes components such as a radio frequency circuit, an input unit, a sensor, an audio circuit, a Wi-Fi module, a power supply, and a Bluetooth module, and details are not described herein again.

When a terminal receives a new message, it often instantly reminds a user of the new message through a notification bar, a pop-up window, ring, or vibration. However, if the user is currently meeting, sleeping, playing game, etc., it is likely that he/she does not want to be disturbed by external messages. To this end, the terminal can be provided with a do not disturb (DND) mode. If the user chooses to enter the DND mode, the terminal enables a DND mechanism. That is, stop reminding the user of the received message through the notification bar, the pop-up window, ring, vibration, and/or other manners. When the DND mode ends, the terminal will remind the user thought a general manner, and can also provide supplementary reminder for messages received during the DND mode.

The "DND mode" satisfies the user's need that he/she can be free of disturbance from external messages at specific time occasions, which in turn introduces new problems. For example, the user sets the terminal to enter the DND mode while watching a movie and the terminal receives an important call before the movie is finished. In this case, the ringing of the important call is prohibited by the DND mode, so the user is likely to miss the important call and face losses.

In order to prevent the user from missing important notifications while ensuring the DND effect, in implementations of the present application, a global preset contact group is set in the terminal, and the user can add important contacts to this group. In the DND mode, when a notification from an important contact in the preset contact group is received, the terminal bypasses the DND mechanism and implements a notification reminder for the important contact; for notifications from contacts other than the preset contact group, the terminal still enables the DND mechanism to avoid such disturbance to the user. The following describes example implementations for illustration.

Figure 3:
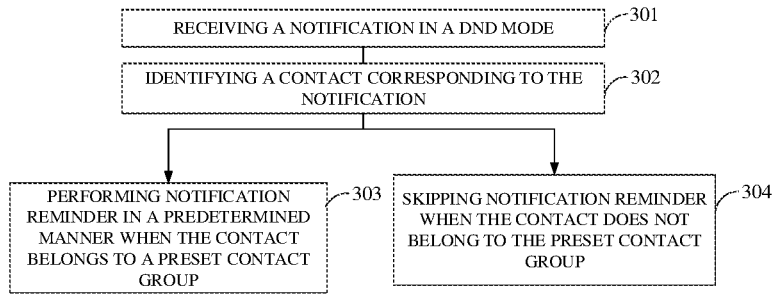
FIG. 3 is a flow chart illustrating a method for notification reminder according to implementations.

FIG. 3 is a flow chart illustrating a method for notification reminder according to implementations. The implementation is illustrated by applying the method to the terminal in FIG. 1 or FIG. 2. The method begins at 301.

At 301, a notification is received in a DND mode, where the notification is at least one of: an incoming call notification, a short message notification, or an application notification.

At 302, a contact corresponding to the notification is identified.

In the related art, when receiving a notification in the DND mode, the terminal directly enables a DND mechanism, that is, prohibits reminder of the notification. In the implementations, in order to achieve notification reminder on important contacts in the DND mode, when the notification is received in the DND mode, the terminal does not directly enable the DND mechanism, but first identifies the contact corresponding to the notification.

In a possible implementation form, when an incoming call notification or a short message notification is received, the terminal obtains a phone number corresponding to the caller or the short message sender, and then identifies the corresponding contact based on the phone number.

In an example, the terminal detects whether the phone number is stored in an address book. If not, the terminal determines that the notification comes from a stranger and enables the DND mechanism for the notification. If yes, the terminal determines that the notification comes from a contact in the address book. The terminal further detects whether the contact belongs to the preset contact group. If yes, the process can proceed to operation 303, and if no, the process can proceed to 304.

For example, when the terminal receives an incoming call notification, it identifies according to the phone number of the caller that the incoming call notification corresponds to the contact "Zhang San" in the address book of the terminal.

In another possible examples, when receiving an application notification pushed by an application (such as an email notification pushed by a mail application, an instant messaging message notification or an audio/video request pushed by an instant messaging application, etc.), the terminal obtains the identifier (ID) of a notifier (i.e., a notifying party or a sender) corresponding to the application notification, and determines the contact corresponding to the application notification according to the ID of the notifier. The ID of the notifier can be the email address of the sender or the instant messaging account of the sender of the instant messaging message.

For the manner to determine the contact according to the ID of the notifier, when the address book of the terminal contains information such as the email address and instant messaging account corresponding to the contact, the terminal searches for the contact corresponding to the application notification in the address book according to the ID of the notifier.

It should be noted that, the implementation only uses the example of determining the contact based on the address book as a schematic description (system level). In other possible implementation forms, the method for notification reminder can also be applied to specific applications (application level). That is, the contact corresponding to the notification is determined based on a contact list in the application, which is not limited herein.

At 303, notification reminder is performed in a predetermined manner when the contact belongs to a preset contact group.

In an example, the predetermined manner includes reminder through at least one of screen display, sound, and vibration.

The terminal is preset with the preset contact group, where the preset contact group is a group that allows notification reminder in the DND mode by default. In an example, contacts in the preset contact group are manually added by the user.

In an example, the preset contact group is a group set by the system of the terminal by default, and is not manually created by the user. The user can only add or remove a contact(s) to/from the preset contact group. In addition, the preset contact group is a global group. That is, no matter what kind of DND mode the terminal is in, the terminal allows notification reminder for contacts in the preset contact group without the need to manually set by the user in various DND modes.

In a possible implementation form, the terminal sets or assigns a corresponding preset group identifier for each contact in the preset contact group. For detecting whether the contact belongs to the preset contact group, the terminal detects whether the contact has a corresponding preset group identifier. If so, the contact is determined to belong to the preset contact group, and in this case, the DND mechanism is bypassed and notification reminder is performed.

In an example, the terminal sets a preset group identifier "VIP" for each contact in the preset contact group. When the contact "Zhang San" corresponds to the identifier "VIP", "Zhang San" is determined to belong to the preset contact group, and incoming call reminder is made for the incoming call from "Zhang San".

At 304, notification reminder is skipped when the contact does not belong to the preset contact group. When the contact does not belong to the preset contact group, the terminal determines that the contact is not an important contact, thereby enabling the DND mechanism for the received notification.

In an example, when the DND mechanism is enabled, the terminal does not display a notification interface, and does not perform notification reminder through sound and vibration.

In conclusion, the terminal can preset the preset contact group that allows notification reminder in the DND mode by default. When a notification from a contact in the preset contact group is received in the DND mode, the terminal can skip the DND mechanism and perform notification reminder, avoiding missing the notification from an important contact. Furthermore, when the terminal is in the DND mode, notification reminder for contacts in the preset contact group is allowed by default without the need to manually set by the user, thereby simplifying the operation process of setting the DND mode.

Figure 4:
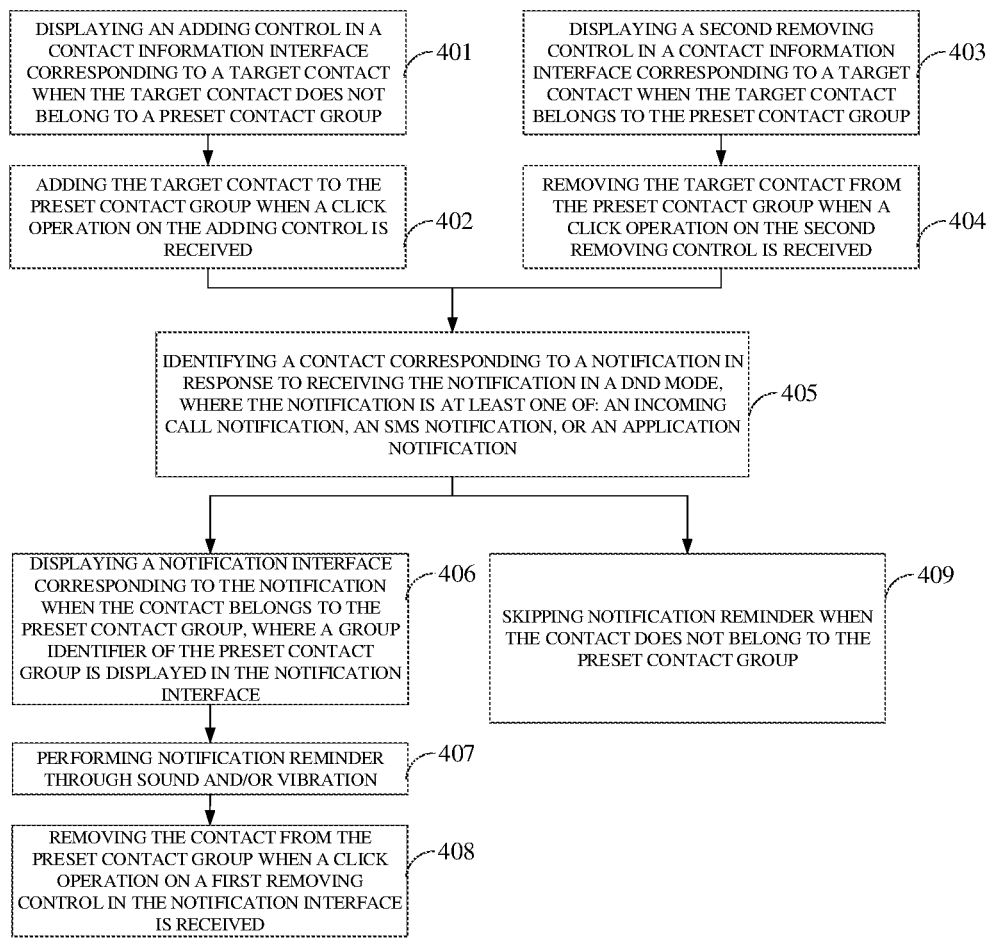
FIG. 4 is a flow chart illustrating a method for notification reminder according to other implementations.

In order to facilitate the user to manage the contacts in the preset contact group, in a possible implementation form, a corresponding control is displayed in a contact information interface corresponding to each contact. The user can add contacts to the preset contact group or remove contacts from the preset contact group through this control. FIG. 4 is a flow chart illustrating a method for notification reminder according to other implementations. The method begins at 401.

At 401, an adding control is displayed in a contact information interface corresponding to a target contact when the target contact does not belong to a preset contact group.

Each contact in the address book corresponds to its own contact information interface. The contact information interface contains contact name, alias, phone number, address, email address, and other information, and the user can update the information contained in the contact information interface.

In a possible implementation form, when receiving the operation of viewing the contact information interface corresponding to the target contact, the terminal detects whether the target contact belongs to the preset contact group. For details about how to detect whether the target contact belongs to the preset contact group, reference can be made to the above operation 303, which is not described herein.

When the target contact does not belong to the preset contact group, to facilitate the user to add the target contact to the preset contact group, the terminal displays an adding control in the current contact information interface. The adding control can be an adding button.

Figure 5:
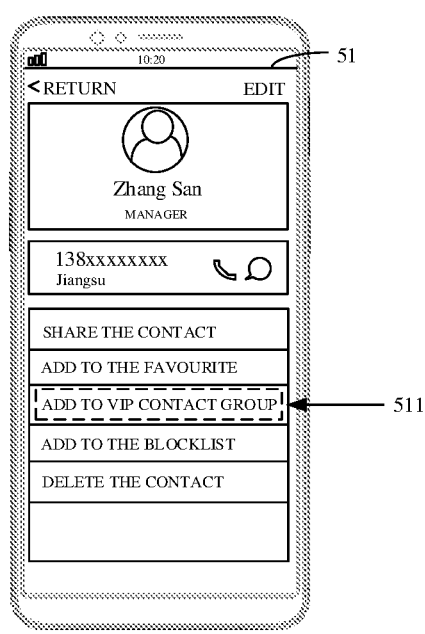
FIG. 5 and FIG. 6 are schematic diagrams each illustrating a contact information interface.

As illustrated in FIG. 5, when a contact information interface 51 corresponding to the contact "Zhang San" is opened, the terminal detects whether "Zhang San" belongs to a VIP contact group (that is, the preset contact group). When "Zhang San" does not belong to the VIP contact group, the terminal displays an adding control 511 in the contact information interface 51.

At 402, the target contact is added to the preset contact group when a click operation on the adding control is received.

When the target contact is an important contact, the user can add the target contact to the preset contact group through the adding control. Correspondingly, the terminal receives the click operation on the adding control, and adds the target contact to the preset contact group.

In a possible implementation form, when receiving the click operation on the adding control, the terminal sets a preset group identifier corresponding to the preset contact group for the target contact. For example, the terminal sets a "VIP" identifier for the target contact.

After the terminal adds the target contact to the preset contact group, the terminal will not display the adding control in the contact information interface. In an example, the terminal replaces the adding control in the contact information interface with a removing control, so that the user can move the target contact out of the preset contact group.

At 403, a second removing control is displayed in a contact information interface corresponding to a target contact when the target contact belongs to the preset contact group.

Contrary to 401 described above, when the target contact already belongs to the preset contact group, the terminal displays a removing control in the contact information interface, so that the user can remove the target contact from the preset contact group through the removing control.

Figure 6:
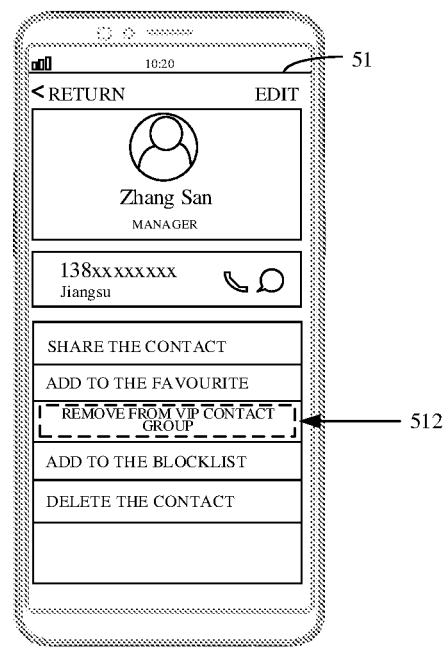

As illustrated in FIG. 6, when the contact information interface 51 corresponding to the contact "Zhang San" is opened, the terminal detects that "Zhang San" belongs to the VIP contact group, and thus displays a removing control 512 in the contact information interface 51.

At 404, the target contact is removed from the preset contact group when a click operation on the second removing control is received.

When the target contact is not an important contact, the user can remove the target contact from the preset contact group through the removing control. Correspondingly, the terminal receives the click operation on the removing control, and removes the target contact from the preset contact group.

In a possible implementation form, when receiving the click operation on the removing control, the terminal deletes a preset group identifier of the target contact. For example, the terminal deletes a "VIP" identifier of the target contact.

After the terminal removes the target contact from the preset contact group, the terminal will not display the removing control in the contact information interface. In an example, the terminal replaces the removing control in the contact information interface with an adding control, so that the user can add the target contact to the preset contact group.

In other possible implementation forms, an interface for managing the preset contact group is provided in the terminal, where the user can uniformly manage contacts in the preset contact group through this interface. In an example, a removing control is provided in the interface, and through the removing control, the user can remove the existing contact(s) in the preset contact group; an adding control is also provided in the interface, and through the adding control, the user can also add a contact(s) to the preset contact group. The manner of managing the preset contact group is not limited herein.

At 405, identify a contact corresponding to a notification in response to receiving the notification in a DND mode, where the notification is at least one of: an incoming call notification, a short message (SMS) notification, or an application notification.

The operation 405 is implemented similar as operations 301 and 302, which is not repeated herein.

At 406, when the contact belongs to the preset contact group, a notification interface corresponding to the notification is displayed, where a group identifier of the preset contact group is displayed in the notification interface.

When the contact belongs to the preset contact group, the terminal, according to a notification type, displays a corresponding notification interface and prompts the user to process the notification. When the notification type is incoming call, the terminal displays an incoming call decline/accept interface. When the notification type is SMS, the terminal displays an SMS read/response interface.

In an example, to let the user know that the current notification comes from a contact in the preset contact group, the terminal displays the group identifier of the preset contact group in the notification interface.

Figure 7:
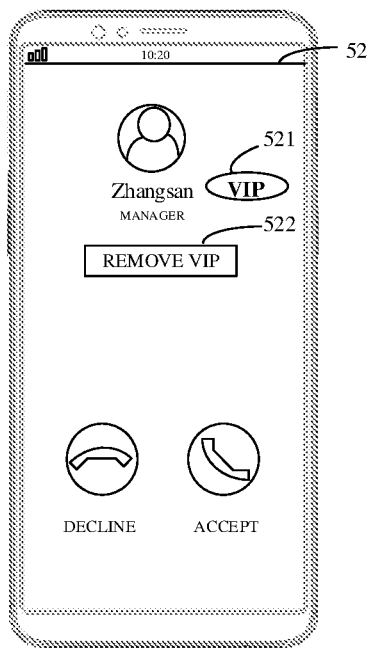
FIG. 7 is a schematic diagram illustrating an incoming call decline/accept interface.

As illustrated in FIG. 7, when an incoming call from the contact "Zhang San" is received in the DND mode, since "Zhang San" belongs to the VIP contact group, the terminal bypasses the DND mechanism to display an incoming call decline/accept interface 52, and displays a group identifier 521 in the incoming call decline/accept interface 52.

At 407, notification reminder is performed through sound and/or vibration.

In order to further improve the reminder effect, the terminal performs sound reminder and/or vibration reminder on the notification while displaying the notification interface.

The terminal can provide DND modes suitable for different scenarios, and the user's perception degree of sound and vibration is different under different DND modes. Therefore, in order to enable the user to perceive sound and vibration, the terminal enables a corresponding prompt tone parameter and/or vibration parameter to perform sound reminder and/or vibration reminder according to a mode type of a current DND mode.

In a possible implementation, notification reminder is performed through sound and/or vibration as follows.

First, a mode type of the DND mode is acquired.

The system of the terminal provides multiple DND modes. When the terminal enters the DND mode, the terminal is in a DND state. In an example, the mode type of the DND mode includes a mute/silent mode, a meeting mode, a game mode, and a sleep mode.

If the current contact belongs to the preset contact group, the terminal determines the mode type of the current DND mode.

Second, when the mode type belongs to a first mode type, perform notification reminder through sound according to a first prompt tone parameter and/or through vibration according to a first vibration parameter, where the first mode type includes at least one of the sleep mode and the mute mode.

Third, when the mode type belongs to a second mode type, perform notification reminder through sound according to a second prompt tone parameter and/or through vibration according to a second vibration parameter, where the second mode type includes at least one of the game mode and the meeting mode.

According to the user's ability to perceive sound and vibration in different mode types of DND modes, the terminal sets different prompt tone parameters and vibration parameters for different mode types of DND modes in advance. After determining the mode type of the current DND mode, the terminal further acquire a prompt tone parameter and a vibration parameter corresponding to the mode type, so as to perform notification reminder through sound and vibration based on the acquired parameters.

The user has a weak ability to perceive sound and vibration in the sleep state, and when the user is sleeping, the terminal is usually set to the sleep mode or the mute mode (i.e., the first mode type). Therefore, the terminal sets the first prompt tone parameter and the first vibration parameter for the first mode type.

When the user is playing game or having a meeting, the user has a strong ability to perceive or sense sound and vibration. When the user is playing game, the terminal is usually set to the game mode (i.e., the second mode type). When the user is having a meeting, the terminal is usually set to the meeting mode (i.e., the second mode type). Therefore, the terminal sets the second prompt tone parameter and the second vibration parameter for the second mode type. A prompt tone volume indicated by the first prompt tone parameter is greater than that indicated by the second prompt tone parameter, and a vibration frequency indicated by the first vibration parameter is greater than that indicated by the second vibration parameter.

In an example, a correspondence relationship among mode types of DND modes, prompt tone parameters, and vibration parameters is illustrated in Table 1.

TABLE 1

| mode type | prompt tone parameter | vibration parameter |
| --- | --- | --- |
| first mode type (the sleep mode and the mute mode) | 40 dB | 5 times per second |
| second mode type (the meeting mode and the game mode) | 30 dB | 3 times per second |

In an example, the prompt tone parameter further includes parameters such as a prompt tone and the vibration parameter further includes parameters such as a vibration amplitude, which is not limited herein.

When the mode type belongs to the first mode type, to increase the probability that the user notices the notification reminder, the terminal performs strong notification reminder according to the first prompt tone parameter and/or the first vibration parameter. When the mode type belongs to the second mode type, the terminal performs general notification reminder according to the second prompt tone parameter and/or the second vibration parameter. That is, the user can sense a louder prompt tone and a faster vibration frequency in strong notification reminder than in general notification reminder.

It should be noted that, the above implementation forms are described by using only two mode types (corresponding to two sets of prompt tone parameters and vibration parameters) as examples. In other possible implementation forms, the terminal can set different prompt tone parameters and vibration parameters for various mode types, which is not limited herein.

At 408, the contact is removed from the preset contact group when a click operation on a first removing control in the notification interface is received.

In the above operations 403 to 404, when removing a contact from the preset contact group, the contact needs to be removed in a contact information interface corresponding to the contact. To improve the efficiency of removing contacts, in a possible implementation form, the notification interface displayed by the terminal further includes the first removing control, and the user can quickly remove the contact from the preset contact group through the first removing control.

As illustrated in FIG. 7, the terminal displays a removing control 522 in the incoming call decline/accept interface 52. When the user clicks the removing control 522, the contact "Zhang San" is removed from the VIP contact group.

At 409, notification reminder is skipped when the contact does not belong to the preset contact group.

The operation 409 is implemented similar as 304, which is not repeated herein.

In the implementation, the terminal can display an adding control or a removing control in the contact information interface, so that the user can quickly add or remove contacts to or from the preset contact group, improving the efficiency of managing the preset contact group. Furthermore, the terminal can display a removing control in the notification interface, which is more convenient for the user to quickly remove the current contact from the preset contact group when receiving the notification reminder, further improving the efficiency of managing the preset contact group.

In the implementation, the terminal can set different prompt tone parameters and vibration parameters for different mode types of DND modes in advance according to the user's ability to perceive sound and vibration in different DND modes. Therefore, the sound and/or vibration reminder can be performed according to the parameters corresponding to the current DND mode, which can improve the user's awareness of notification reminder in various DND modes, and further reduce the probability that the user misses notifications from important contacts.

In the above implementation forms, only one preset contact group is set in the terminal, and notification for each contact in the preset contact group is free of the DND mechanism. However, in some scenarios, the user may desire to be reminded only of notifications from some contacts in the preset contact group.

In a possible implementation form, multiple preset contact groups corresponding to different importance levels are set in the terminal, and the user can add a contact to a corresponding preset contact group according to the importance of the contact. When a notification is received in the DND mode, the terminal determines an importance level of a contact according to a preset contact group to which the contact belongs, and then determines whether to perform notification reminder based on the importance level. The following uses schematic implementations for description.

Figure 8:
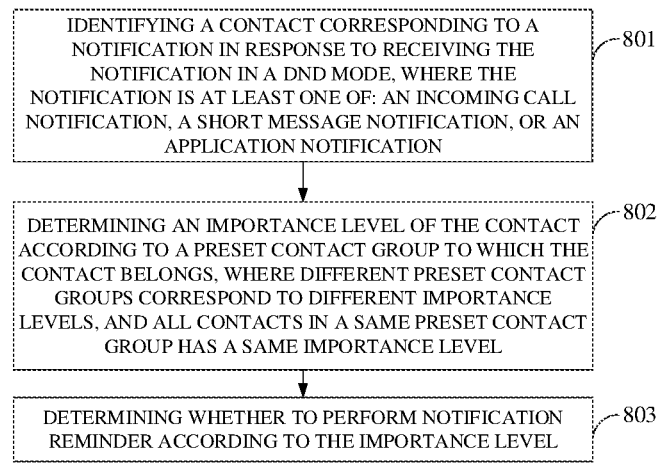
FIG. 8 is a flow chart illustrating a method for notification reminder according to implementations.

FIG. 8 is a flow chart illustrating a method for notification reminder according to implementations. The method begins at 801.

At 801, a contact corresponding to a notification is identified in response to receiving the notification in a DND mode, where the notification is at least one of: an incoming call notification, a short message notification, or an application notification.

In a possible implementation form, when an incoming call notification or a short message notification is received, the terminal obtains a phone number corresponding to the caller or the short message sender, and then identifies the corresponding contact based on the phone number.

In an example, the terminal detects whether the phone number is stored in an address book. If not, the terminal determines that the notification comes from a stranger and enables the DND mechanism for the notification. If yes, the terminal determines that the notification comes from a contact in the address book. The terminal further detects a preset contact group to which the contact belongs and the process proceeds to 802. If the contact does not belong to any preset contact group, the terminal enables the DND mechanism for the notification.

In another possible implementation form, when receiving an application notification pushed by an application (such as an email notification pushed by a mail application, an instant messaging message notification or an audio/video request pushed by an instant messaging application, etc.), the terminal obtains the identifier (ID) of a notifier (i.e., notifying party) corresponding to the application notification, and determines the contact corresponding to the application notification according to the ID of the notifier. The ID of the notifier can be the email address of the sender or the instant messaging account of the sender of the instant messaging message.

For the manner to determine the contact according to the ID of the notifier, when the address book of the terminal contains information such as the email address and instant messaging account corresponding to the contact, the terminal searches for the contact corresponding to the application notification in the address book according to the ID of the notifier.

At 802, an importance level of the contact is determined according to a preset contact group to which the contact belongs, where different preset contact groups correspond to different importance levels, and all contacts in a same preset contact group has a same importance level.

At least two preset contact groups are preset in the terminal, and each preset contact group corresponds to a respective importance level. Correspondingly, the user manually adds the contact to a corresponding preset contact group according to the importance of the contact in the address book.

For example, a correspondence relationship between different preset contact groups and importance levels is illustrated in Table 2.

TABLE 2

| preset contact group | importance level | contact |
| --- | --- | --- |
| first contact group | first level | Liu Yi, Chen Er, Zhang San |
| second contact group | second level | Li Si, Wang Wu, Zhao Liu, Sun Qi |
| third contact group | third level | Zhou Ba, Wu Jiu, Zheng Shi |

For example, the terminal recognizes that the contact corresponding to the notification is "Zhang San", and determines that an importance level corresponding to the contact "Zhang San" is the first level according to the correspondence relationship illustrated in Table 2.

For a manner to determine a preset contact group to which a contact belongs, in a possible implementation form, the terminal sets different group identifiers for contacts in different preset contact groups, and the terminal determines the preset contact group to which the contact belongs according to the group identifier corresponding to the contact.

For example, the terminal sets group identifiers "VIP1", "VIP2", and "VIP3" for contacts in the first contact group, the second contact group, and the third contact group, respectively. The terminal determines that contact "Zhang San" belongs to the first contact group according to the group identifier "VIP1" corresponding to the contact "Zhang San".

At 803, whether to perform notification reminder is determined according to the importance level.

In a possible implementation form, under different DND modes, the importance levels of the contacts for whom notification reminder is allowed are different. Correspondingly, the terminal determines whether to perform notification reminder according to the mode type of the current DND mode and the importance level of the contact.

For performing notification reminder, refer to operation 303 described above, and for skipping notification reminder, refer to operation 304 described above, which will not be described herein.

For example, in the mute mode and the game mode, the importance level of contacts for whom notification reminder is allowed is greater than or equal to the first level. In the meeting mode, the importance level of contacts for whom notification reminder is allowed is greater than or equal to the second level. In the sleep mode, the importance level of contacts for whom notification reminder is allowed is greater than or equal to the third level. With reference to the data in Table 2, when an incoming call notification from the contact "Zhang San" is received in the game mode, the terminal performs incoming call reminder. When an incoming call notification from the contact "Zhang San" is received in the meeting mode or the sleep mode, the terminal does not perform incoming call reminder.

In conclusion, in the implementation, multiple preset contact groups corresponding to different importance levels are preset in the terminal. When a notification is received in the DND mode, the terminal determines an importance level of a contact according to a preset contact group to which the contact belongs, and then determines whether to perform notification reminder according to the importance level. With aid of the multiple-level control mechanism, the terminal can manage notification reminder finely, and prevent the user from being disturbed by contacts other than important contacts while avoiding missing incoming calls and short messages from important contacts, improving the accuracy of notification reminder and rendering the notification reminder in DND mode more in line with user expectations.

In a possible implementation form, the terminal establishes a correspondence relationship between different importance levels and target DND modes in advance. Correspondingly, the terminal determines whether to perform notification reminder according to the current DND mode and the target DND mode corresponding to the important level of the current contact.

Figure 9:
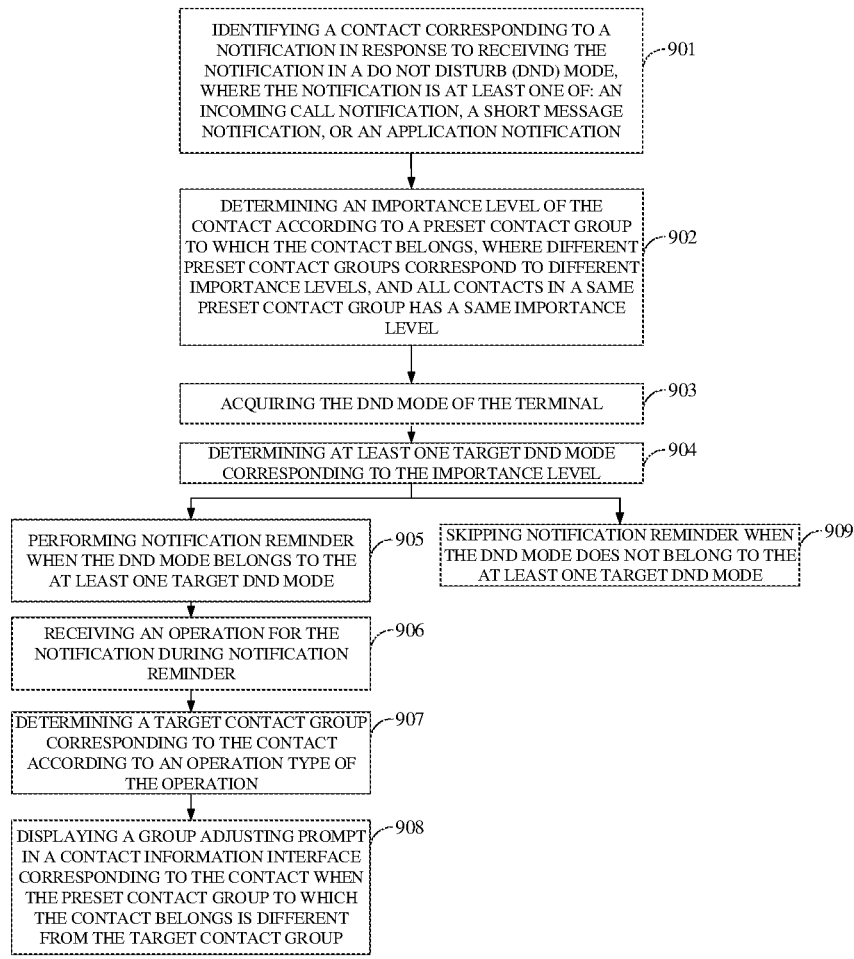
FIG. 9 is a flow chart illustrating a method for notification reminder according to other implementations.

FIG. 9 is a flow chart illustrating a method for notification reminder according to other implementations. The method begins at 901.

At 901, a contact corresponding to a notification is identified in response to receiving the notification in a DND mode, where the notification is at least one of: an incoming call notification, a short message notification, or an application notification.

At 902, an importance level of the contact is determined according to a preset contact group to which the contact belongs, where different preset contact groups correspond to different importance levels, and all contacts in a same preset contact group has a same importance level.

The operations 901 and 902 are implemented similar as the operations 801 and 802, which is not repeated herein.

In a possible implementation form, if the current contact belongs to a certain preset contact group, the terminal further obtains the current DND mode; if the current contact does not belong to any preset contact group, the terminal prohibits reminder of the notification.

At 903, the DND mode of the terminal is acquired.

The system of the terminal provides multiple DND modes suitable for different scenarios. When the terminal enters the DND mode, the terminal is in the DND state. In an example, the DND mode includes a mute mode, a meeting mode, a game mode, and a sleep mode.

At 904, at least one target DND mode corresponding to the importance level is determined.

For notifications from contacts with a high importance level, the user usually wants to be reminded in various DND modes. For notifications from contacts with a low importance level, the user wants to be reminded in some DND modes and does not want to be reminded in specific DND modes.

Therefore, the terminal sets a correspondence relationship between different importance levels and at least one target DND mode in advance, and the at least one target DND mode refers to at least one DND mode that allows notification reminder. Different importance levels correspond to different numbers of target DND modes, and the importance level has a positive correlation with the number of target DND modes, that is, the higher the importance level, the more types of target DND modes.

In a possible implementation form, the correspondence relationship between different importance levels and the at least one target DND mode is illustrated in Table 3.

TABLE 3

| importance level | at least one target DND mode |
| --- | --- |
| first level | mute mode and game mode |
| second level | mute mode, game mode, and meeting mode |
| third level | mute mode, game mode, meeting mode, and sleep mode |

When the importance level is the first level, the mute mode and the game mode are determined as the at least one target DND mode.

A contact with an importance level of the first level has the lowest importance. Therefore, the terminal will perform notification reminder only when an incoming call or a short message from the contact is received in the mute mode or the game mode.

When the importance level is the second level, the mute mode, the game mode, and the meeting mode are determined as the at least one target DND mode.

A contact with an importance level of the second level has higher importance than a contact with an importance level of the first level. Therefore, in addition to the mute mode and the game mode, in the meeting mode, the terminal also performs notification reminder on an incoming call or a short message from the contact with an importance level of the second level.

When the importance level is the third level, the mute mode, the game mode, the meeting mode, and the sleep mode are determined as the at least one target DND mode.

For a contact with the highest importance level (i.e., the third level), the terminal determines all DND modes as the at least one target DND mode, so that in the mute mode, the game mode, the meeting mode, and the sleep mode, the user can receive an incoming call and a short message form this contact.

In the above implementation form, only three preset contact groups are examples for schematic description. In other possible implementation forms, the terminal can set two or more preset contact groups, which is not limited herein.

It should be noted that, there is no sequence restrict on the above operations 903 and 904, that is, operations 903 and 904 can be executed at the same time, and which operation is executed first is not limited herein.

Through the above operations 903 and 904, after the at least one target DND mode and the current or present DND mode of the terminal (that is, the DND mode that the terminal is currently in) are obtained, the terminal further detects whether the current DND mode belongs to the at least one target DND mode. If yes, the following operations 905 to 908 are performed, and if no, the following operation 909 is performed.

At 905, notification reminder is performed when the DND mode belongs to the at least one target DND mode.

If the current DND mode of the terminal belongs to the at least one target DND mode corresponding to the current contact, the terminal performs notification reminder in a predetermined manner.

In an example, the terminal displays a notification interface corresponding to the notification, and performs sound reminder and/or vibration reminder. The notification interface includes a group identifier of the preset contact group to which the contact belongs.

In a possible implementation form, sound reminder manners and vibration reminder manners corresponding to contacts of different importance levels are different. During the notification reminder, the terminal acquires the corresponding prompt tone parameter and vibration parameter according to the importance level of the current contact, and then performs notification reminder according to the acquired parameters. In an example, the operation 905 can be implemented as follows.

First, acquire a prompt tone parameter and/or a vibration parameter corresponding to the importance level when the DND mode belongs to the at least one target DND mode.

In order to achieve better reminder effect for important contacts, the importance level has a positive correlation with a prompt tone volume indicated by the prompt tone parameter, and the importance level has a positive correlation with a vibration frequency indicated by the vibration parameter. In short, the higher the importance level of the contact, the higher the prompt tone volume and the higher the vibration frequency during notification reminder.

For example, a correspondence relationship between importance levels, prompt tone parameters, and vibration parameters is illustrated in Table 4.

TABLE 4

| importance level | prompt tone parameter | vibration parameter |
| --- | --- | --- |
| first level | 30 dB | 2 times per second |
| second level | 40 dB | 4 times per second |
| third level | 50 dB | 6 times per second |

For example, when receiving a call or a short message from the contact "Zhang San", the terminal obtains the prompt tone parameter of 30 dB and the vibration parameter of 2 times per second according to the data recorded in Table 2 and Table 4.

Second, perform notification reminder through sound according to the prompt tone parameter, and/or through vibration according to the vibration parameter.

Furthermore, according to the acquired prompt tone parameter and vibration parameter, the terminal performs sound reminder and vibration reminder.

In other possible implementation forms, the user can also set respective prompt tone and/or vibration manner for different importance levels, which is not limited herein.

At 906, an operation for the notification is received during notification reminder.

During notification reminder, the terminal receives the user's operation for the notification through the notification interface. In an example, when the notification is an incoming call notification, the terminal receives an answer operation or a hangup operation through the notification interface; when the notification is a short message, the terminal receives a reply operation or a delete operation through the notification interface (for example, a short message processing interface).

At 907, a target contact group corresponding to the contact is determined according to an operation type of the operation.

Since the importance of the contact may change, in order to improve the accuracy of the notification reminder, the terminal updates the target contact group corresponding to the contact according to the operation type of the received operation.

For example, the terminal defines the answer operation and the hangup operation for an incoming call notification, and the terminal defines the reply operation and the delete operation for a short message notification. The terminal determines that an importance level of the target contact group is higher than or equal to an importance level of the preset contact group when the operation type is the answer operation or the reply operation. The terminal determines that the importance level of the target contact group is lower than or equal to the importance level of the preset contact group when the operation type is the hangup operation or the delete operation.

To improve the accuracy of the target contact group determined, in a possible implementation form, the terminal counts operation numbers of various operations, and re-determines the target contact group corresponding to the contact when the operation number reaches a threshold. For example, the threshold can be 10 times.

For example, for each contact, the terminal counts the number of times the user answers an incoming call, hangs up an incoming call, replies a short message, and deletes a short message. When the number of times the user answers an incoming call or replies a short message reaches the threshold, the terminal determines that the importance level of the target contact group is higher than or equal to the importance level of the preset contact group to which the contact currently belongs. When the number of times the user hangs up an incoming call or deletes a short message reaches the threshold, the terminal determines that the importance level of the target contact group is lower than or equal to the importance level of the preset contact group to which the contact currently belongs.

At 908, a group adjusting prompt is displayed in a contact information interface corresponding to the contact when the preset contact group to which the contact belongs is different from the target contact group.

When the target contact group determined by the terminal is not the same as the preset contact group to which the contact currently belongs, the terminal displays a corresponding group adjusting prompt, prompting the user to adjust the contact to the target contact group.

In a possible implementation form, the terminal displays the group adjusting prompt in a contact information interface corresponding to the contact, so that the user can adjust the group corresponding to the contact in the contact information interface.

Figure 10:
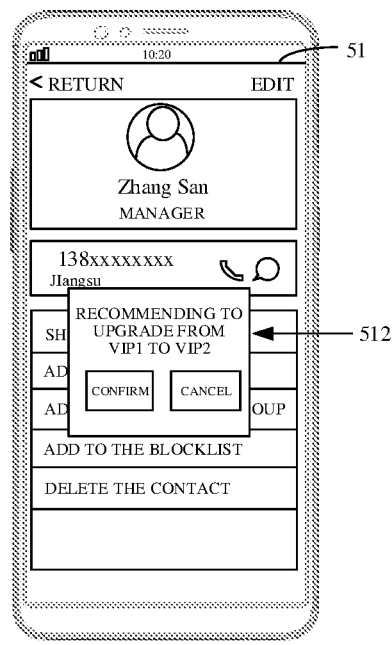
FIG. 10 is a schematic diagram illustrating an interface for prompting contact group adjusting.

As illustrated in FIG. 10, if in the DND mode, the number of times the user answers an incoming call from the contact "Zhang San" reaches 10 times, when entering the contact information interface 51 corresponding to the contact "Zhang San", the terminal displays a group adjusting prompt 512, prompting the user to upgrade the contact "Zhang San" from VIP1 (corresponding to the importance level of the first level) to VIP2 (corresponding to the importance level of the second level).

In other possible implementation forms, the terminal can automatically adjust the contact according to the determined target contact group, which is not limited herein.

At 909, notification reminder is skipped when the DND mode does not belong to the at least one target DND mode.

The operation 909 is implemented similar as the operation 304, which is not repeated herein.

In the implementation, the terminal can obtain the corresponding prompt tone parameter and vibration parameter according to the importance level corresponding to the current contact. Thereafter, sound reminder and vibration reminder can be performed according to the obtained parameters, thereby improving user's sensitivity to notifications from important contacts, and further reducing the probability that the user misses notifications from important contacts.

In the implementation, after the notification reminder is performed, the terminal can re-determine the target contact group corresponding to the contact according to the operation type of the operation of the user for the notification, and display the group adjusting prompt when the target contact group does not match with the group to which the contact currently belongs. It is convenient for the user to adjust the importance level of the contact in real time, which improves the accuracy of subsequent notification reminder.

In the above implementations, the importance of the contacts in the address book is determined by the user, and the important contacts are manually added to the preset contact group by the user. However, in this way, it is difficult for the generated preset contact group to completely cover all important contacts (some important contacts may be missed due to manual adding by the user), which leads to a lower accuracy of subsequent notification reminder based on the preset contact group. In order to further render the preset contact group to completely cover all important contacts and improve the accuracy of subsequent notification reminder, this application provides a method for group adding.

Figure 11:
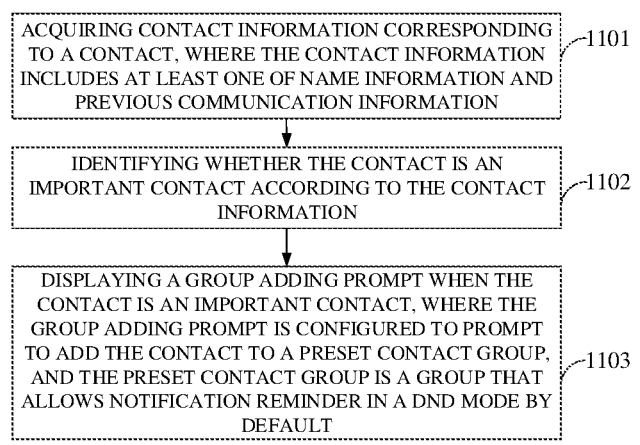
FIG. 11 is a flow chart illustrating a method for group adding according to implementations.

FIG. 11 is a flow chart illustrating a method for group adding according to implementations.

At 1101, acquire contact information corresponding to a contact, where the contact information includes at least one of name information and previous communication information.

For each contact in an address book, the terminal obtains contact information corresponding to each contact, where the contact information includes name information of the contact and previous communication information with the contact.

Since the contact information may change with time, in a possible implementation form, the terminal obtains the contact information at predetermined time intervals. For example, the terminal obtains the contact information every 10 days.

In an example, the name information includes at least one of a contact alias and a contact name; the previous communication information includes (previous) call information and (previous) contents of a sent short message.

For example, the name information obtained by the terminal includes a contact name "Zhang San" and an alias "manager", and the obtained previous communication information includes call information and contents of sent short messages in the last ten days.

At 1102, whether the contact is an important contact is identified according to the contact information.

The terminal analyzes the obtained contact information to determine whether the contact is an important contact.

In an example, the terminal determines the social relationship between the user and each contact according to the name information of each contact, thereby identifying important contacts. Furthermore or alternatively, the terminal analyzes the previous communication information with each contact, and then identifies important contacts from the dimensions (aspects) of a call frequency, a call duration, a time period of a call, a ration of the number of answers to the number of hangups, the number of callbacks, and contents of a sent short message.

At 1103, a group adding prompt is displayed when the contact is an important contact, where the group adding prompt is configured to prompt to add the contact to a preset contact group, and the preset contact group is a group that allows notification reminder in a DND mode by default.

For the identified important contact, the terminal displays the group adding prompt in a predetermined manner, so as to add the important contact to the preset contact group according to the prompt.

In other possible implementation forms, the terminal automatically adds the identified important contact to the preset contact group, and marks or prompts the added contact, which is not limited herein.

After the user adds the contact to the preset contact group according to the group adding prompt, the terminal determines whether to perform notification reminder on the notification received in the DND mode based on the preset contact group. For the detailed notification reminder process, refer to the method for notification reminders in the foregoing implementations, which will not be repeated herein.

To sum up, in the implementation, the terminal can obtain the contact information of the contact, recognize an important contact based on the contact information, and display the group adding prompt for the important contact, so that the user can add the important contact to the preset contact group according to the group adding prompt. In the subsequent process, based on the preset contact group, in the DND mode, the terminal allows notification reminder on contacts in the preset contact group, so as to prevent the user from missing the notifications from important contacts. In related art, the importance of the contact is determined by the user, and the contact is manually added to the preset contact group by the user. In contrast, the preset contact group of the implementation has a higher coverage and accuracy, improving the accuracy of subsequent notification reminder based on this group.

Figure 12:
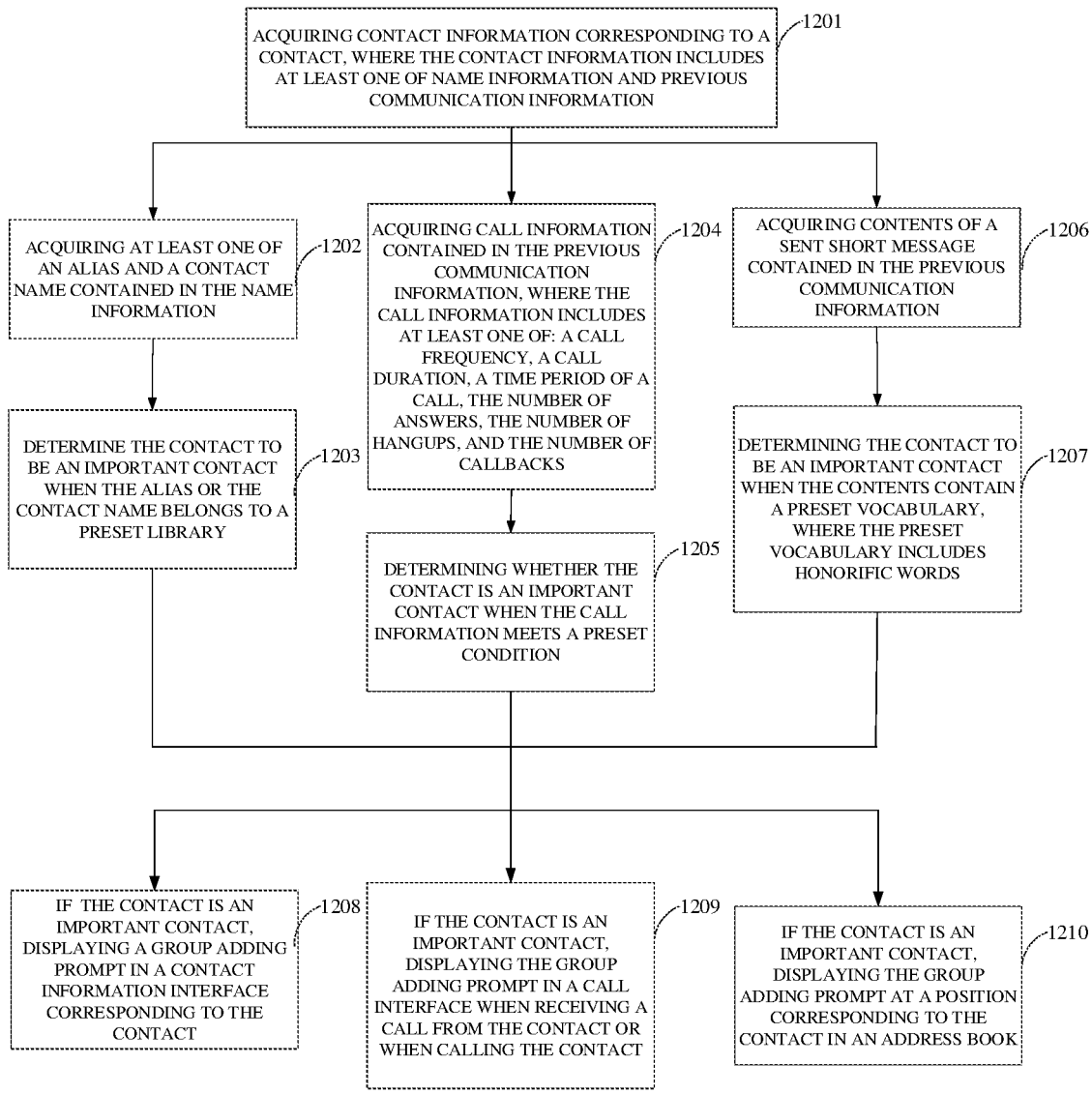
FIG. 12 is a flow chart illustrating a method for group adding according to other implementations.

In a possible implementation form, in order to improve the accuracy of the group adding prompt, the terminal considers both the name information and the previous communication information to determine important contacts. FIG. 12 is a flow chart illustrating a method for group adding according to other implementations. The method begins at 1201.

At 1201, acquire contact information corresponding to a contact, where the contact information includes at least one of name information and previous communication information.

The operation 1201 is implemented similar as the operation 1101, which is not repeated herein.

In the implementation, the terminal obtains name information and previous communication information of each contact.

At 1202, acquire at least one of an alias and a contact name contained in the name information.

Generally, the name information set by the user for a contact can reflect the social relationship between the user and the contact, and different social relationships correspond to different importance. Therefore, the terminal can determine the importance of the contact according to the name information of the contact.

For example, the name information acquired by the terminal contains the contact name "Zhang San" and the alias "manager".

At 1203, determine the contact to be an important contact when the alias or the contact name belongs to a preset library.

Furthermore, the terminal detects whether the alias or the contact name belongs to the preset library. If yes, determine that the contact is an important contact, and if no, determine that the contact is not an important contact.

In a possible implementation form, the preset library is generated based on the name information of the important contacts added to the preset contact group. In an example, the preset vocabulary includes name information of the important contacts added, and other name information associated with the name information.

For example, in the preset contact group, the name information of the important contacts added includes manager and chairman. The terminal then obtains vocabularies associated with manager and chairman, such as supervisor, leader, and representative, so as to generate the preset vocabulary. That is, the preset vocabulary includes manager, chairman, supervisor, leader, and representative.

In other possible implementation forms, the terminal can also obtain the preset vocabulary from the server through configuration update, which is not limited herein.

For example, since the alias of the contact "Zhang San" belongs to the preset vocabulary, the terminal will determine that "Zhang San" is an important contact.

At 1204, acquire call information contained in the previous communication information, where the call information includes at least one of: a call frequency, a call duration, a time period of a call, the number of answers, the number of hangups, and the number of callbacks.

Generally, the closer the social relationship between users, the more frequent calls therebetween. Therefore, in a possible implementation form, the terminal identifies an important contact based on the call information in the previous communication information.

In an example, the call information (within 5 days) corresponding to the contact "Zhang San" obtained by the terminal is illustrated in Table 5.

TABLE 5

| time period of a call | call duration | answer/ accept | hangup/ decline | callback |
|---|---|---|---|---|
| 2017.12.6 10:16:20 | 12:56 | ✓ | x | x |
| 2017.12.7 14:46:27 | 20:13 | ✓ | x | x |
| 2017.12.7 19:02:30 | 7:16 | ✓ | x | x |
| 2017.12.9 09:16:20 | 9:15 | x | x | ✓ |
| 2017.12.9 14:18:12 | 0:00 | x | ✓ | x |
| 2017.12.10 01:52:49 | 2:13 | ✓ | x | x |
| 2017.12.10 05:46:18 | 5:09 | ✓ | x | x |

In an example, the call information obtained by the terminal further includes information such as the number of calling (or dialing) and the place of a call, which is not limited herein.

At 1205, determine whether the contact is an important contact when the call information meets a preset condition.

In an example, the preset condition includes at least one of the following.

First, the call frequency is greater than a first threshold.

In general, the more important a contact is, the more frequently the user will talk to the contact. Therefore, when the call frequency with a contact is greater than the first threshold, the terminal determines that the contact is an important contact. For example, the first threshold is 1 time per day.

In a possible implementation form, the terminal counts a call frequency with each contact, calculates an average value of the call frequency with each contact, and further determines the first threshold based on the average value. The first threshold value is greater than or equal to the average value.

With reference to the call information in Table 5, the terminal calculates that a call frequency with the contact "Zhang San" is 7÷5=1.4 times per day, which is greater than 1 time per day. Therefore, the terminal determines the contact "Zhang San" as an important contact.

Second, the call duration is longer than a second threshold.

In addition to the call frequency, the terminal can also determine the importance of a contact according to call duration. When the call duration with a contact is greater than the second threshold, the terminal determines that the contact is an important contact. For example, the second threshold is 5 minutes once.

In a possible implementation form, the terminal counts a call duration with each contact, calculates an average call duration (i.e., an average value of the call duration with each contact), and further determines the second threshold based on the average call duration, where the second threshold is greater than or equal to the average call duration.

With reference to the call information in Table 5, the terminal calculates that the call duration with the contact "Zhang San" is greater than 5 minutes once. Therefore, the terminal determines the contact "Zhang San" as an important contact.

Third, the number of calls in a predetermined time period is greater than a third threshold.

In a possible implementation form, the terminal analyzes an active period and an inactive period of the user according to time distribution of power consumption, and determines the inactive period as the predetermined period. For example, the predetermined period is: 0:00 to 07:00.

When the number of calls between the user and the contact within the predetermined period is greater than the third threshold, the terminal determines that the contact is an important contact. For example, the third threshold is 1 time.

In combination with the call information in Table 5, the terminal calculates that the number of calls with the contact "Zhang San" during the time period 0:00 to 07:00 is 5 times, which is greater than 1 time (the third threshold). Therefore, the terminal determines the contact "Zhang San" as an important contact.

Fourth, a ratio of the number of answers to the number of hangups is greater than a fourth threshold.

In a possible implementation form, the terminal counts an answer/hangup ratio (the number of answers+1)/(the number of hangups+1)) corresponding to each contact, and calculates an average value of the answer/hangup ratio corresponding to each contact. The fourth threshold value is further determined based on the average value. The fourth threshold value is greater than or equal to the average value.

With reference to the call information in Table 5, the terminal calculates that the answer/hangup ratio corresponding to the contact "Zhang San" is 5, which is greater than 2.5 (the fourth threshold). Therefore, the terminal determines the contact "Zhang San" as an important contact.

Fifth, the number of callbacks is greater than a fifth threshold.

In a possible implementation form, the terminal counts the number of callbacks corresponding to each contact (call back immediately after not answering the call), calculates an average value of the number of callbacks corresponding to each contact, and further determines the fifth threshold based on the average value. The fifth threshold is greater than or equal to the average value.

With reference to the call information in Table 5, the terminal calculates that the number of callbacks corresponding to the contact "Zhang San" is 1, which is greater than 0.8 (the fifth threshold). Therefore, the terminal determines the contact "Zhang San" as an important contact.

Herein, the foregoing five possible implementation forms are only for description, which does not constitutes limitation to this application.

At 1206, acquire contents of a sent short message contained in the previous communication information.

When the user sends a short message to an important contact, the contents of the sent short message usually contain some specific words. As a result, the terminal can analyze the contents of the sent short message to identify the important contact.

For example, the terminal obtains that contents of a short message sent to "Zhang San" are "Manager Zhang, could you please tell me if you are available this afternoon?".

At 1207, determine the contact to be an important contact when the contents contain a preset vocabulary, where the preset vocabulary includes honorific words.

In an example, the honorific words (i.e., conventional words that are used to express respect, politeness, or social deference, for example, "please", "gentlemen", "madam", and "lady") are stored in the terminal. When the contents of the sent short message contain the honorific word, the terminal determines that the contact is an important contact.

In an example, the honorific words are obtained based on contents of short messages sent to the added important contacts.

At 1208, if the contact is an important contact, a group adding prompt is displayed in a contact information interface corresponding to the contact.

When the contact is an important contact, the terminal displays the group adding prompt in the contact information interface corresponding to the contact, prompting the user to add the contact to the preset contact group.

Figure 13:
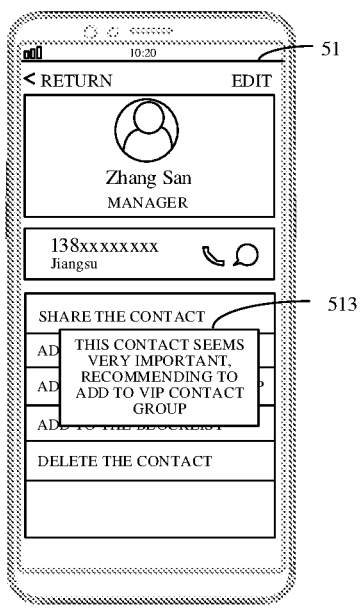
FIGS. 13-15 are schematic diagrams each illustrating an interface for displaying group adding information.

As illustrated in FIG. 13, the terminal identifies that the contact "Zhang San" is an important contact, and displays a group adding prompt 513 in the contact information interface 51.

At 1209, if the contact is an important contact, the group adding prompt is displayed in a call interface when receiving a call from the contact or when calling the contact.

In the above operation 1208, the identified important contacts can only be known to the user through the contact information interface. In order to further improve the efficiency of group adding (that is, add a contact(s) to a group), in a possible implementation form, when receiving an incoming call from an important contact (in a non-do not disturb mode) or when calling an important contact, the terminal displays the group adding prompt in the call interface, prompting the user to add the important contact to the preset contact group.

Figure 14:
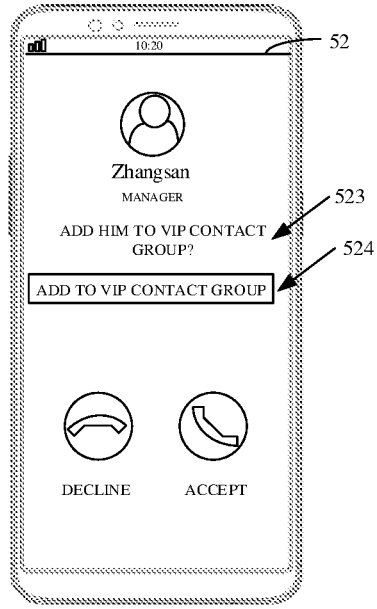

As illustrated in FIG. 14, the terminal identifies that "Zhang San" is an important contact. When calling "Zhang San", the terminal displays a group adding prompt 523 in a call interface 52 and displays a quick adding control 524, which is convenient for the user to quickly add "Zhang San" to the VIP contact group.

At 1210, if the contact is an important contact, the group adding prompt is displayed at a position corresponding to the contact in an address book.

In another possible implementation form, for the identified important contacts (not yet added to the preset contact group), the terminal displays the group adding prompt at a position corresponding to the important contact in the address book. When the user opens the address book, according to the group adding prompt, the important contact can be added to the preset contact group.

Figure 15:
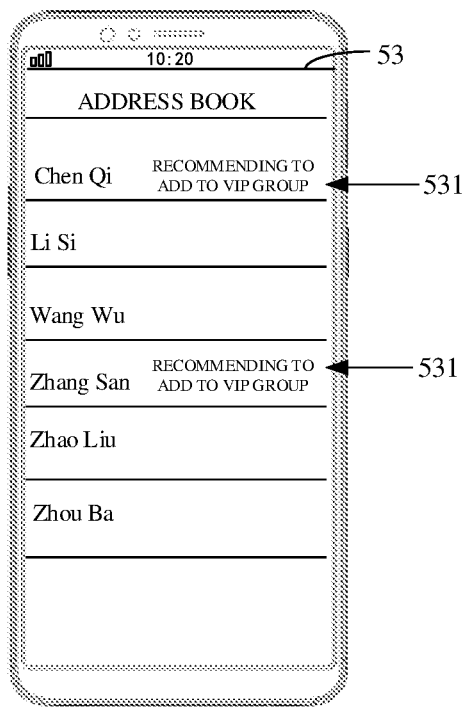

As illustrated in FIG. 15, the terminal determines that the contacts "Chen Qi" and "Zhang San" are important contacts. Therefore, when the address book 53 is opened, a group adding prompt 531 is displayed at an entry corresponding to each of "Chen Qi" and "Zhang San".

In other possible implementation forms, an interface for editing the preset contact group is set in the terminal. When the user chooses to add a contact to the preset contact group in the interface, the determined important contact(s) is displayed in the interface for the user to achieve fast adding. For example, when the user triggers adding a contact to the preset contact group, a drop-down box is displayed in the interface and the determined important contacts are preferentially displayed in the drop-down box.

In the implementation, the terminal can identify whether the contact is an important contact according to the name information (containing the contact name and the alias), the previous communication information, and/or the contents of the sent short messages. The terminal can also display the group adding prompt for important contacts, improving the accuracy of group adding prompt, and thus avoiding missing of important contact caused by manually identifying and manually adding important contacts by the user.

Furthermore, for the identified important contacts, the terminal displays the group adding prompt in the contact information interface, the call interface, or the address book, which is convenient for the user to quickly add important contacts to the preset contact group, improving the efficiency of group adding.

Figure 16:
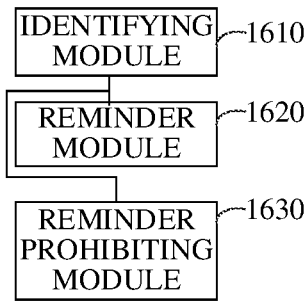
FIG. 16 is a structural block diagram illustrating a device for notification reminder according to implementations.

FIG. 16 is a structural block diagram illustrating a device for notification reminder according to implementations. The device includes an identifying module 1610, a reminder module 1620, and a reminder prohibiting module 1630.

The identifying module 1610 is configured to identify a contact corresponding to a notification in response to receiving the notification in a DND mode, where the notification is at least one of: an incoming call notification, a short message notification, or an application notification.

The reminder module 1620 is configured to perform notification reminder in a predetermined manner when the contact belongs to a preset contact group.

The reminder prohibiting module 1630 is configured to skip notification reminder when the contact does not belong to the preset contact group. The preset contact group is a group that allows notification reminder in the DND mode by default.

Figure 17:
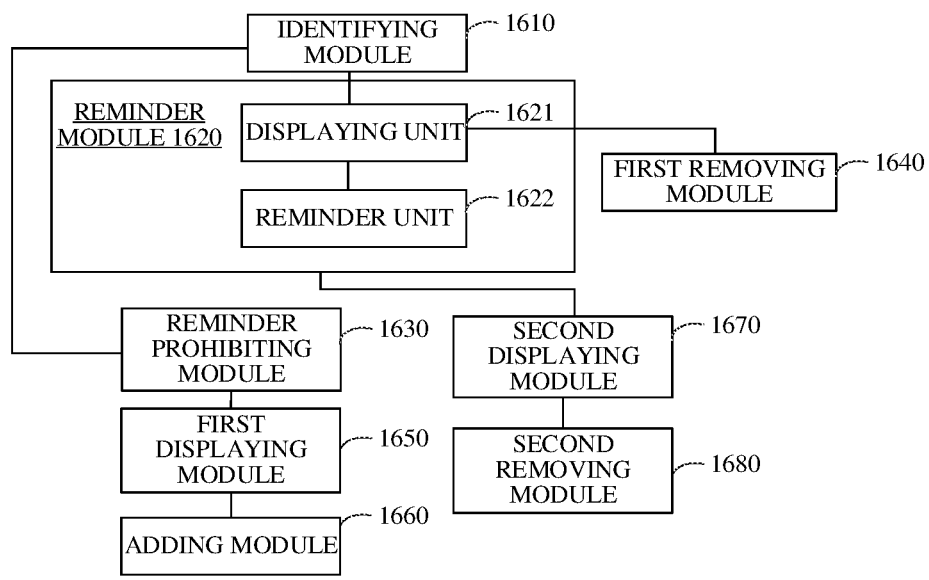
FIG. 17 is a structural block diagram illustrating a device for notification reminder according to other implementations.

As illustrated in FIG. 17, in at least one implementation, the reminder module 1620 includes a displaying unit 1621 and a reminder unit 1622.

The displaying unit 1621 is configured to display a notification interface corresponding to the notification, where a group identifier of the preset contact group is displayed in the notification interface.

The reminder unit 1622 is configured to perform notification reminder through sound and/or vibration.

In at least one implementation, the reminder unit 1622 is configured to: acquire a mode type of the DND mode; perform notification reminder through sound according to a first prompt tone parameter and/or through vibration according to a first vibration parameter when the mode type belongs to a first mode type, where the first mode type includes a sleep mode and/or a mute mode; perform notification reminder through sound according to a second prompt tone parameter and/or through vibration according to a second vibration parameter when the mode type belongs to a second mode type, where the second mode type includes a game mode and/or a meeting mode, and where a prompt tone volume indicated by the first prompt tone parameter is greater than that indicated by the second prompt tone parameter, and a vibration frequency indicated by the first vibration parameter is greater than that indicated by the second vibration parameter.

In at least one implementation, a first removing control is displayed in the notification interface and the device further includes a first removing module 1640. The first removing module 1640 is configured to remove the contact from the preset contact group when a click operation on the first removing control is received.

In at least one implementation, the device further includes a first displaying module 1650 and an adding module 1660.

The first displaying module 1650 is configured to display an adding control in a contact information interface corresponding to a target contact when the target contact does not belong to the preset contact group.

The adding module 1660 is configured to add the target contact to the preset contact group when a click operation on the adding control is received.

In at least one implementation, the device further includes a second displaying module 1670 and a second removing module 1680.

The second displaying module 1670 is configured to display a second removing control in a contact information interface corresponding to a target contact when the target contact belongs to the preset contact group.

The second removing module 1680 is configured to remove the target contact from the preset contact group when a click operation on the second removing control is received.

Figure 18:
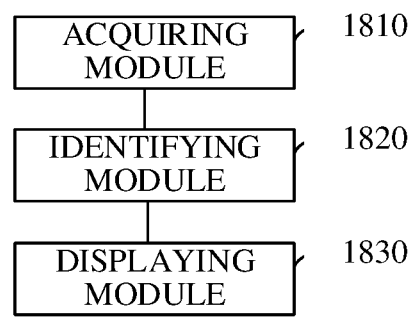
FIG. 18 is a structural block diagram illustrating a device for group adding according to implementations.

FIG. 18 is a structural block diagram illustrating a device for group adding according to implementations. The device includes an acquiring module 1810, an identifying module 1820, and a displaying module 1830.

The acquiring module 1810 is configured to acquire contact information corresponding to a contact, where the contact information includes at least one of name information and previous communication information.

The identifying module 1820 is configured to identify whether the contact is an important contact according to the contact information.

The displaying module 1830 is configured to display a group adding prompt when the contact is an important contact, where the group adding prompt is configured to prompt to add the contact to a preset contact group, and the preset contact group is a group that allows notification reminder in a DND mode by default.

Figure 19:
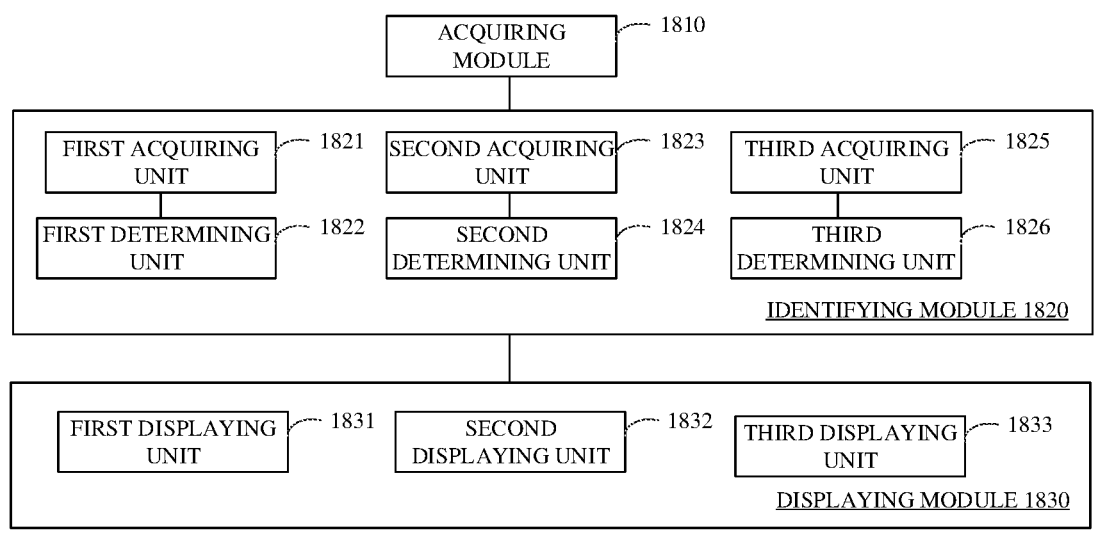
FIG. 19 is a structural block diagram illustrating a device for group adding according to other implementations.

As illustrated in FIG. 19, in at least one implementation, the contact information includes the name information. The identifying module 1820 includes a first acquiring unit 1821 and a first determining unit 1822.

The first acquiring unit 1821 is configured to acquire at least one of an alias and a contact name contained in the name information.

The first determining unit 1822 is configured to determine the contact to be an important contact when the alias or the contact name belongs to a preset alias library.

In at least one implementation, the contact information includes the previous communication information. The identifying module 1820 includes a second acquiring unit 1823 and a second determining unit 1824.

The second acquiring unit 1823 is configured to acquire call information contained in the previous communication information, where the call information includes at least one of: a call frequency, a call duration, a time period of a call, the number of answers, the number of hangups, and the number of callbacks.

The second determining unit 1824 is configured to determine whether the contact is an important contact when the call information meets a preset condition.

In at least one implementation, the preset condition includes at least one of the following.

The call frequency is greater than a first threshold.

The call duration being longer than a second threshold.

The number of calls in a predetermined time period is greater than a third threshold.

A ratio of the number of answers to the number of hangups is greater than a fourth threshold.

The number of callbacks is greater than a fifth threshold.

In at least one implementation, the identifying module 1820 further includes a third acquiring unit 1825 and a third determining unit 1826.

The third acquiring unit 1825 is configured to acquire contents of a sent short message contained in the previous communication information.

The third determining unit 1826 is configured to determine the contact to be an important contact when the contents contain a preset vocabulary, where the preset vocabulary includes honorific words.

In at least one implementation, the displaying module 1830 includes a first displaying unit 1831, a second displaying unit 1832, and a third displaying unit 1833.

The first displaying unit 1831 is configured to display the group adding prompt in a contact information interface corresponding to the contact.

The second displaying unit 1832 is configured to display the group adding prompt in a call interface when receiving a call from the contact or when calling the contact.

The third displaying unit 1833 is configured to display the group adding prompt at a position corresponding to the contact in an address book.

Figure 20:
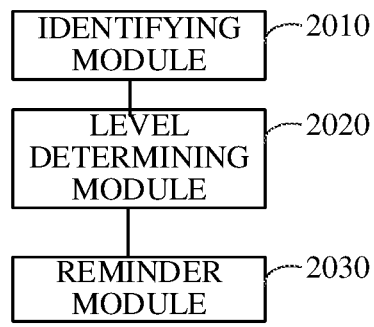
FIG. 20 is a structural block diagram illustrating a device for notification reminder according to implementations.

FIG. 20 is a structural block diagram illustrating a device for notification reminder according to implementations. The device includes an identifying module 2010, a level determining module 2020, and a reminder module 2030.

The identifying module 2010 is configured to identify a contact corresponding to a notification in response to receiving the notification in a DND mode, where the notification is at least one of: an incoming call notification, a short message notification, or an application notification.

The level determining module 2020 is configured to determine an importance level of the contact according to a preset contact group to which the contact belongs.

The reminder module 2030 is configured to determine whether to perform notification reminder according to the importance level.

Different preset contact groups correspond to different importance levels, and all contacts in a same preset contact group has a same importance level.

Figure 21:
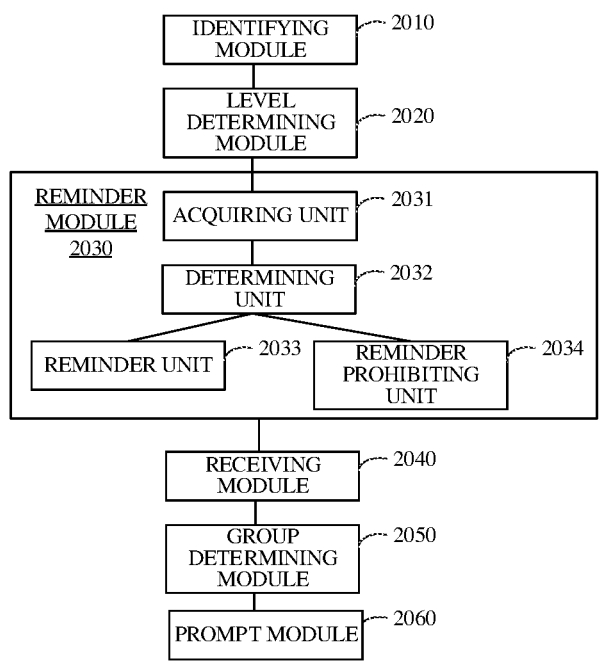
FIG. 21 is a structural block diagram illustrating a device for notification reminder according to other implementations.

As illustrated in FIG. 21, in at least one implementation, the reminder module 2030 includes an acquiring unit 2031, a determining unit 2032, a reminder unit 2033, and a reminder prohibiting unit 2034.

The acquiring unit 2031 is configured to acquire the DND mode of the terminal.

The determining unit 2032 is configured to determine at least one target DND mode corresponding to the importance level.

The reminder unit 2033 is configured to perform notification reminder when the DND mode belongs to the at least one target DND mode.

The reminder prohibiting unit 2034 is configured to skip notification reminder when the DND mode does not belong to the at least one target DND mode.

Different importance levels correspond to different numbers of target DND modes, and the importance level has a positive correlation with the number of target DND modes.

In at least one implementation, the determining unit 2032 is configured to: determine a mute mode and a game mode to be the at least one target DND mode when the importance level is a first level, determine the mute mode, the game mode, and a meeting mode to be the at least one target DND mode when the importance level is a second level, and determine the mute mode, the game mode, the meeting mode, and a sleep mode to be the at least one target DND mode when the importance level is a third level.

In at least one implementation, the reminder unit 2033 is configured to: acquire at least one of a prompt tone parameter and a vibration parameter corresponding to the importance level when the DND mode belongs to the at least one target DND mode, and perform notification reminder through sound according to the prompt tone parameter and/or through vibration according to the vibration parameter, where the importance level has a positive correlation with a prompt tone volume indicated by the prompt tone parameter, and the importance level has a positive correlation with a vibration frequency indicated by the vibration parameter.

In at least one implementation, the device further includes a receiving module 2040, a group determining module 2050, and a prompt module 2060.

The receiving module 2040 is configured to receive an operation for the notification during notification reminder.

The group determining module 2050 is configured to determine a target contact group corresponding to the contact according to an operation type of the operation.

The prompt module 2060 is configured to display a group adjusting prompt in a contact information interface corresponding to the contact when the preset contact group to which the contact belongs is different from the target contact group.

An importance level of the target contact group is higher than or equal to an importance level of the preset contact group when the operation type is an answer operation or a reply operation. The importance level of the target contact group is lower than or equal to the importance level of the preset contact group when the operation type is a hangup operation or a delete operation.

Implementations further provide a non-transitory computer readable storage medium. The non-transitory computer readable storage medium is configured to store a computer program which, when executed by a processor, causes the processor to execute the following.

A contact corresponding to a notification is identified in response to receiving the notification in DND mode, where the notification is at least one of: an incoming call notification, a short message notification, or an application notification. A notification interface corresponding to the notification is displayed when the contact belongs to a preset contact group, where a group identifier of the preset contact group is displayed in the notification interface. Perform notification reminder through sound and/or vibration. Skip notification reminder when the contact does not belong to the preset contact group. The preset contact group is a group that allows notification reminder in the DND mode by default.

In at least one implementation, the computer program executed by the processor to perform notification reminder in the predetermined manner is executed by the processor to display a notification interface corresponding to the notification, where a group identifier of the preset contact group is displayed in the notification interface, and to perform notification reminder through at least one of sound or vibration.

Implementations further provide a computer program product. The computer program product stores at least one instruction. When loaded and executed by the processor, the at least one instruction is configured to implement the method for notification reminder or the method for group adding described in the above implementations.

What is claimed is:

1. A method for notification reminder, comprising:
    receiving a notification in a do not disturb (DND) mode, wherein the notification is at least one of: an incoming call notification, a short message notification, or an application notification;
    identifying a contact corresponding to the notification;
    determining an importance level of the contact according to a preset contact group to which the contact belongs when the contact belongs to the preset contact group;
    acquiring the DND mode of the terminal;
    determining at least one target DND mode corresponding to the importance level;
    performing the notification reminder when the DND mode belongs to the at least one target DND mode;
    skipping the notification reminder when the DND mode does not belong to the at least one target DND mode, wherein different importance levels correspond to different numbers of target DND modes, and the importance level has a positive correlation with the number of target DND modes, wherein different preset contact groups correspond to different importance levels, and all contacts in a same preset contact group has a same importance level;
    performing the notification reminder in a predetermined manner when determining to perform the notification reminder; and
    skipping the notification reminder when the contact does not belong to the preset contact group, wherein the preset contact group is a group that allows the notification reminder in the DND mode by default.

2. The method of claim 1, wherein performing the notification reminder in the predetermined manner comprises:
    displaying a notification interface corresponding to the notification, wherein a group identifier of the preset contact group is displayed in the notification interface; and
    performing the notification reminder through at least one of sound or vibration.

3. The method of claim 2, wherein performing the notification reminder through the at least one of sound or vibration comprises:
    acquiring a mode type of the DND mode;
    when the mode type belongs to a first mode type comprising at least one of a sleep mode and a mute mode, performing the notification reminder through at least one of:
        sound according to a first prompt tone parameter; or
        vibration according to a first vibration parameter; and
    when the mode type belongs to a second mode type comprising at least one of a game mode and a meeting mode, performing the notification reminder through at least one of:
        sound according to a second prompt tone parameter; or
        vibration according to a second vibration parameter,
    wherein a prompt tone volume indicated by the first prompt tone parameter is greater than that indicated by the second prompt tone parameter, and a vibration frequency indicated by the first vibration parameter is greater than that indicated by the second vibration parameter.

4. The method of claim 2, wherein a removing control is displayed in the notification interface and the method further comprises:
after displaying the notification interface corresponding to the notification,
removing the contact from the preset contact group when a click operation on the removing control is received.

5. The method of claim 1, further comprising:
before identifying the contact corresponding to the notification,
displaying an adding control in a contact information interface corresponding to a target contact when the target contact does not belong to the preset contact group; and
adding the target contact to the preset contact group when a click operation on the adding control is received.

6. The method of claim 1, further comprising:
before identifying the contact corresponding to the notification,
displaying a removing control in a contact information interface corresponding to a target contact when the target contact belongs to the preset contact group; and
removing the target contact from the preset contact group when a click operation on the removing control is received.

7. The method of claim 1, wherein determining the at least one target DND mode corresponding to the importance level comprises:
determining a mute mode and a game mode to be the at least one target DND mode when the importance level is a first level;
determining the mute mode, the game mode, and a meeting mode to be the at least one target DND mode when the importance level is a second level; and
determining the mute mode, the game mode, the meeting mode, and a sleep mode to be the at least one target DND mode when the importance level is a third level.

8. A terminal, comprising:
at least one processor; and
a non-transitory computer readable storage, coupled to the at least one processor and storing at least one computer executable instruction thereon which, when executed by the at least one processor, causes the at least one processor to:
receive a notification in a do not disturb (DND) mode, wherein the notification is at least one of: an incoming call notification, a short message notification, or an application notification;
identify a contact corresponding to the notification;
determine an importance level of the contact according to a preset contact group to which the contact belongs when the contact belongs to the preset contact group;
acquire the DND mode of the terminal;
determine at least one target DND mode corresponding to the importance level;
perform the notification reminder when the DND mode belongs to the at least one target DND mode;
skip the notification reminder when the DND mode does not belong to the at least one target DND mode, wherein different importance levels correspond to different numbers of target DND modes, and the importance level has a positive correlation with the number of target DND modes, wherein different preset contact groups correspond to different importance levels, and all contacts in a same preset contact group has a same importance level;
perform the notification reminder in a predetermined manner when determining to perform the notification reminder; and
skip the notification reminder when the contact does not belong to the preset contact group, wherein the preset contact group is a group that allows the notification reminder in the DND mode by default.

9. The terminal of claim 8, wherein the at least one processor configured to perform the notification reminder in the predetermined manner is configured to:
display a notification interface corresponding to the notification, wherein a group identifier of the preset contact group is displayed in the notification interface; and
perform the notification reminder through at least one of sound or vibration.

10. The terminal of claim 9, wherein the at least one processor configured to perform the notification reminder through the at least one of sound or vibration is configured to:
acquire a mode type of the DND mode;
when the mode type belongs to a first mode type comprising at least one of a sleep mode and a mute mode, perform the notification reminder through at least one of:
sound according to a first prompt tone parameter; or
vibration according to a first vibration parameter; and
when the mode type belongs to a second mode type comprising at least one of a game mode and a meeting mode, perform the notification reminder through at least one of:
sound according to a second prompt tone parameter; or
vibration according to a second vibration parameter,
wherein a prompt tone volume indicated by the first prompt tone parameter is greater than that indicated by the second prompt tone parameter, and a vibration frequency indicated by the first vibration parameter is greater than that indicated by the second vibration parameter.

11. The terminal of claim 9, wherein a removing control is displayed in the notification interface and the at least one processor is further configured to:
remove the contact from the preset contact group when a click operation on the removing control is received.

12. The terminal of claim 8, wherein the at least one processor is further configured to:
display an adding control in a contact information interface corresponding to a target contact when the target contact does not belong to the preset contact group; and
add the target contact to the preset contact group when a click operation on the adding control is received.

13. The terminal of claim 8, wherein the at least one processor is further configured to:
display a removing control in a contact information interface corresponding to a target contact when the target contact belongs to the preset contact group; and
remove the target contact from the preset contact group when a click operation on the removing control is received.

14. The terminal of claim 8, wherein the at least one processor configured to determine the at least one target DND mode corresponding to the importance level is configured to:
- determine a mute mode and a game mode to be the at least one target DND mode when the importance level is a first level;
- determine the mute mode, the game mode, and a meeting mode to be the at least one target DND mode when the importance level is a second level; and
- determine the mute mode, the game mode, the meeting mode, and a sleep mode to be the at least one target DND mode when the importance level is a third level.

15. A non-transitory computer readable storage medium storing a computer program which, when executed by a processor, causes the processor to:
- receive a notification in a do not disturb (DND) mode, wherein the notification is at least one of: an incoming call notification, a short message notification, or an application notification;
- identify a contact corresponding to the notification;
- determine an importance level of the contact according to a preset contact group to which the contact belongs when the contact belongs to the preset contact group;
- acquire the DND mode of the terminal;
- determine at least one target DND mode corresponding to the importance level;
- perform the notification reminder when the DND mode belongs to the at least one target DND mode;
- skip the notification reminder when the DND mode does not belong to the at least one target DND mode, wherein different importance levels correspond to different numbers of target DND modes, and the importance level has a positive correlation with the number of target DND modes, wherein different preset contact groups correspond to different importance levels, and all contacts in a same preset contact group has a same importance level;
- perform the notification reminder in a predetermined manner when determining to perform the notification reminder; and
- skip the notification reminder when the contact does not belong to the preset contact group, wherein the preset contact group is a group that allows the notification reminder in the DND mode by default.

16. The non-transitory computer readable storage medium of claim 15, wherein the computer program executed by the processor to perform the notification reminder in the predetermined manner is executed by the processor to:
- display a notification interface corresponding to the notification, wherein a group identifier of the preset contact group is displayed in the notification interface; and
- perform the notification reminder through at least one of sound or vibration.

* * * * *